US012373645B2

(12) United States Patent
Gupta et al.

(10) Patent No.: US 12,373,645 B2
(45) Date of Patent: Jul. 29, 2025

(54) SYSTEM FOR AUTOMATICALLY AUGMENTING A MESSAGE BASED ON CONTEXT EXTRACTED FROM THE MESSAGE

(71) Applicant: Microsoft Technology Licensing, LLC, Redmond, WA (US)

(72) Inventors: Rahul Gupta, Telangana (IN); Manish Kansal, Telangana (IN); Bhavesh S Sharma, Telangana (IN); Pradeep Kumar Reddy K, Telangana (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 382 days.

(21) Appl. No.: 17/533,342

(22) Filed: Nov. 23, 2021

(65) Prior Publication Data

US 2023/0161962 A1    May 25, 2023

(51) Int. Cl.
| | | |
|---|---|---|
| G06F 40/295 | (2020.01) | |
| G06F 40/30 | (2020.01) | |
| G06Q 10/107 | (2023.01) | |
| H04L 51/046 | (2022.01) | |
| H04L 51/08 | (2022.01) | |

(52) U.S. Cl.
CPC ............ *G06F 40/295* (2020.01); *G06F 40/30* (2020.01); *G06Q 10/107* (2013.01); *H04L 51/046* (2013.01); *H04L 51/08* (2013.01)

(58) Field of Classification Search
CPC ..... G06F 40/295; G06F 40/30; G06Q 10/107; H04L 51/046; H04L 51/08; G10L 15/22
See application file for complete search history.

(56) References Cited

U.S. PATENT DOCUMENTS

| | | |
|---|---|---|
| 8,010,602 B2 | 8/2011 | Shen et al. |
| 8,286,085 B1 | 10/2012 | Denise et al. |
| 9,251,248 B2 | 2/2016 | Agrawal |
| (Continued) | | |

FOREIGN PATENT DOCUMENTS

| | | | |
|---|---|---|---|
| WO | 2019032204 A1 | 2/2019 | |
| WO | 2021141680 A1 | 7/2021 | |
| WO | WO-2021215804 A1 * | 10/2021 | ........... G06F 40/279 |

OTHER PUBLICATIONS

"International Search Report and Written Opinion Issued in PCT Application No. PCT/US22/041791", Mailed Date: Dec. 21, 2022, 17 Pages.

(Continued)

*Primary Examiner* — Paras D Shah
*Assistant Examiner* — Oluwadamilola M Ogunbiyi
(74) *Attorney, Agent, or Firm* — Ray Quinney & Nebeker P.C.; Paul N. Taylor

(57) ABSTRACT

An augmentation service receives message information about a message being authored by a message sender. The augmentation service calls a topic extraction service to extract a topic from the message information and then accesses inferences, based upon the topics, to identify a suggested augmentation to the message. The suggested augmentation is surfaced for the sender of the message. Similarly, a messaging system can process the message prior to sending it to a recipient and insert suggested augmentations into the message so that the recipient sees a message which has additional content over that which was sent by the sender.

24 Claims, 14 Drawing Sheets

(56) References Cited

U.S. PATENT DOCUMENTS

| | | |
|---|---|---|
| 9,594,831 B2 | 3/2017 | Wang et al. |
| 10,331,480 B2 | 6/2019 | Gupta et al. |
| 10,380,629 B2 | 8/2019 | Amin et al. |
| 10,475,000 B2* | 11/2019 | Sarrazin ............... G06Q 10/107 |
| 10,572,845 B2 | 2/2020 | Johansen et al. |
| 10,992,607 B2 | 4/2021 | Gupta et al. |
| 11,057,324 B1* | 7/2021 | Ahmed .................. H04L 51/42 |
| 11,093,870 B2 | 8/2021 | Wilde et al. |
| 11,134,044 B1* | 9/2021 | Johansson ............... H04L 51/18 |
| 11,837,005 B2* | 12/2023 | Tiyyagura ............. G06F 40/295 |
| 2006/0074932 A1 | 4/2006 | Fong et al. |
| 2007/0130368 A1 | 6/2007 | Martin et al. |
| 2008/0312905 A1* | 12/2008 | Balchandran ......... G06F 40/284 704/9 |
| 2012/0151377 A1 | 6/2012 | Schultz et al. |
| 2013/0262438 A1* | 10/2013 | Palay .................. G06F 16/3344 707/E17.014 |
| 2014/0358521 A1* | 12/2014 | Mikutel ................ G06F 40/205 704/9 |
| 2015/0046827 A1* | 2/2015 | Akselrod .............. G06F 16/908 715/738 |
| 2015/0081293 A1* | 3/2015 | Hsu ......................... G10L 15/26 704/235 |
| 2015/0156148 A1* | 6/2015 | Doulton ................. H04L 51/08 709/206 |
| 2015/0222581 A1* | 8/2015 | Zhou ....................... H04L 51/08 709/206 |
| 2015/0294220 A1 | 10/2015 | Oreif |
| 2016/0117072 A1* | 4/2016 | Sharifi .................... G06F 9/543 715/769 |
| 2017/0086039 A1* | 3/2017 | Wittig ..................... H04W 4/14 |
| 2017/0197152 A1* | 7/2017 | Bojja .................... G06F 40/216 |
| 2018/0067959 A1* | 3/2018 | Sorvillo ................ G06F 16/156 |
| 2018/0121499 A1 | 5/2018 | Joshi et al. |
| 2019/0243669 A1 | 8/2019 | Gupta et al. |
| 2019/0244175 A1* | 8/2019 | Ogrinz ................. G06Q 10/063 |
| 2019/0251493 A1 | 8/2019 | Wilde et al. |
| 2019/0280998 A1* | 9/2019 | Katis ....................... H04L 65/61 |
| 2020/0065857 A1* | 2/2020 | Lagi .................... G06Q 30/0254 |
| 2020/0287908 A1* | 9/2020 | Treleaven ............... H04L 51/08 |
| 2020/0372075 A1* | 11/2020 | Rogynskyy ............. H04L 51/48 |
| 2021/0064692 A1* | 3/2021 | Srinivasan .......... G06F 16/9035 |
| 2021/0073469 A1 | 3/2021 | Gupta et al. |
| 2021/0117928 A1 | 4/2021 | Gupta et al. |
| 2021/0200515 A1* | 7/2021 | Rayapati ............... G06F 40/216 |
| 2021/0200951 A1* | 7/2021 | Gao ...................... G06F 40/242 |
| 2021/0234820 A1* | 7/2021 | Dhawan ................. H04L 51/08 |
| 2021/0289069 A1* | 9/2021 | Moshir ................... H04W 4/12 |
| 2021/0374749 A1* | 12/2021 | Vukich ................ G06Q 20/389 |
| 2021/0400008 A1* | 12/2021 | Khan .................... H04L 51/063 |
| 2022/0171935 A1* | 6/2022 | Goyal ...................... G06N 3/08 |
| 2022/0222737 A1* | 7/2022 | Pronski ............. G06Q 30/0637 |
| 2022/0229993 A1* | 7/2022 | Vu ........................ G06F 40/205 |
| 2022/0358473 A1* | 11/2022 | Williams ............. G06Q 20/385 |
| 2024/0186885 A1* | 6/2024 | Murthy .................. B60L 53/22 |

OTHER PUBLICATIONS

"Application as Filed in U.S. Appl. No. 16/939,181", filed Jul. 27, 2020, 50 Pages.

"Application as Filed in U.S. Appl. No. 17/011,928", filed Sep. 3, 2020, 68 Pages.

"Introduction to Information Retrieval", Retrieved from: https://web.stanford.edu/class/cs276/handouts/personalization-lecture-6-per-page.pdf, Oct. 25, 2017, 8 Pages.

"Learning to rank", Retrieved from: https://en.wikipedia.org/wiki/Learning_to_rank#In_Information_retrieval, Oct. 17, 2021, 14 Pages.

Dali, et al., "Learning to Rank for Personalized News Article Retrieval", In JMLR: Workshop and Conference Proceedings, Sep. 30, 2010, pp. 152-159.

Gysel, et al., "Reply With: Proactive Recommendation of Email Attachments", In repository of arXiv:1710.06061v2. Nov. 16, 2017, 10 Pages.

Safi, et al., "Learning-to-Rank for Hybrid User Profiles", In Research in Computing Science, vol. 132, 2017, pp. 107-127.

* cited by examiner

SYSTEM FOR AUTOMATICALLY AUGMENTING A MESSAGE BASED ON CONTEXT EXTRACTED FROM THE MESSAGE

BACKGROUND

Computing systems are currently in wide use. Some such computing systems are systems which host services, such as messaging services. Messaging services can include electronic mail (email) services, meeting and calendar services, chat messaging services, and other services where users can send messages to one another. Such computer systems can be arranged in different configurations. For example, such computer systems can include client applications and web interfaces backed by server software to facilitate the communication of messages.

These types of computing systems can provide functionality which allows a user to attach an attachment to a message as well. Also, when writing a message, a message author may often send the message to a plurality of different recipients, such as users in a group, users on a team, a list of individual users, etc. When messages are sent to a plurality of recipients, the sender may use what is referred to as an "@mention" technique. That is, the sender may use the name of an individual within the body of the message, so that the identified individual may be assigned a task, may be assigned to provide particular information, etc. In one example, the sender uses a term such as "@JohnDoe" in identifying individual users within the body of the message. This type of technique can be referred to as a "mention" or a "@mention" technique.

The discussion above is merely provided for general background information and is not intended to be used as an aid in determining the scope of the claimed subject matter.

SUMMARY

An augmentation service receives message information about a message being authored by a message sender. The augmentation service calls a topic extraction service to extract a topic or context from the message information and then accesses inferences, based upon the topics, to identify a suggested augmentation to the message. The suggested augmentation is surfaced for the sender of the message. Similarly, a messaging system can process the message prior to sending it to a recipient and insert suggested augmentations into the message so that the recipient sees a message which has additional content over that which was sent by the sender.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
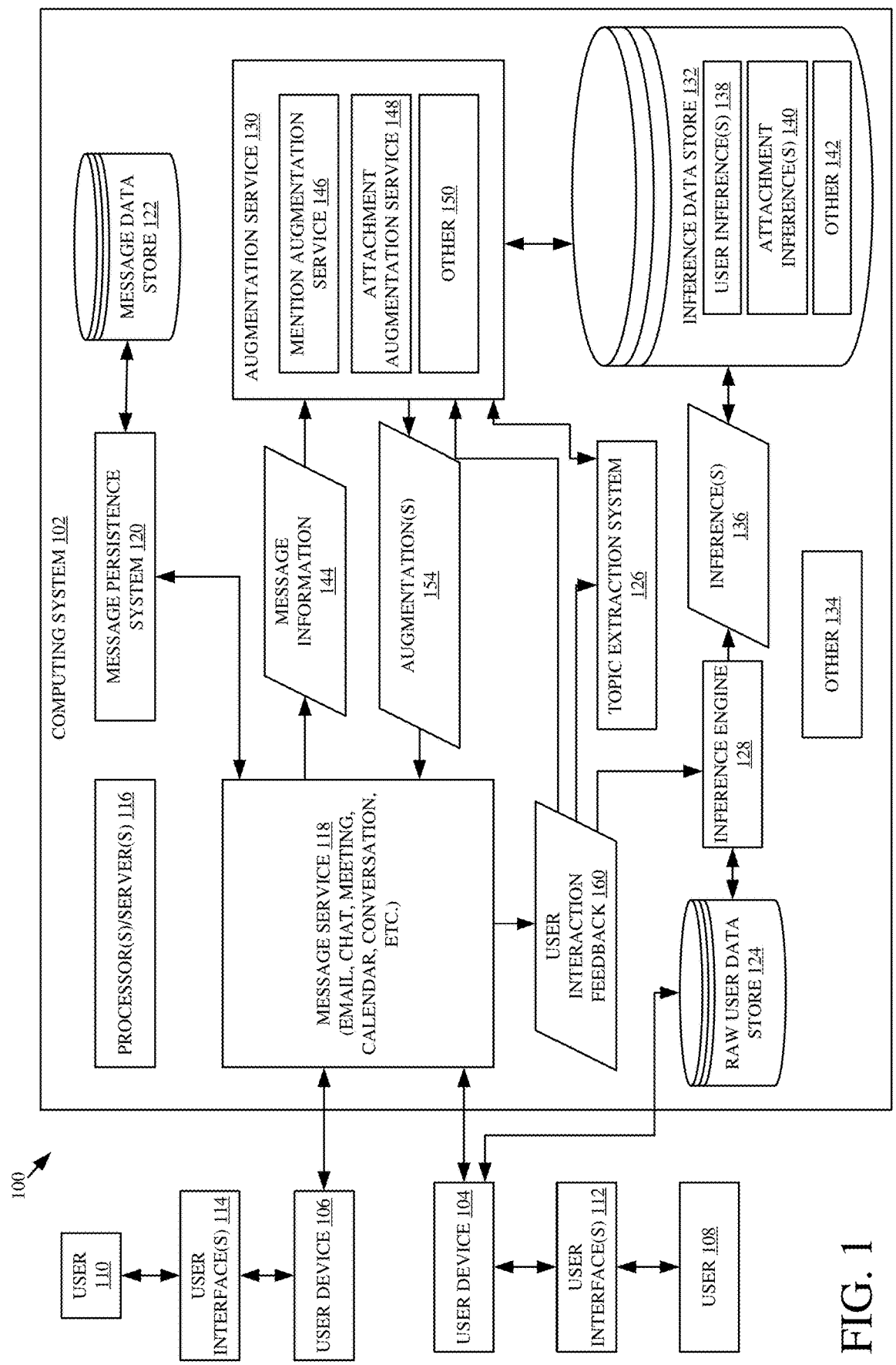
FIG. 1 is a block diagram of one example of a computing system.

As discussed above, there are many computer systems in which users can author and send messages to other users or to groups of other users. Often, an author of a message does not have sufficient information to explicitly address the message to an individual (within a group of individuals) and thus sends a generic message to a group of individuals. This presents problems in that the sender is unsure of who will be tasked to respond to the message or conversation within the group. Similarly, the recipients of such a message are unsure of who is supposed to respond, which results in a loss of productivity.

Therefore, the present system describes a mention augmentation service which analyzes message data corresponding to the message being authored and automatically identifies a user who may be correlated to the message. The present system accesses a data store that stores pre-indexed information that correlates users to message data. The identified user can be suggested to the author of the message for insertion as a "@mention" within the body of the message. The author can then interact with the suggestion (such as accepting it, or dismissing it) and the user interaction can be fed back to the system to improve the suggestion process. Because the user and message data are pre-indexed, identifying suggested users can be done quickly, reducing processing time, central processing unit (cpu) cycles, and network bandwidth over a system that requires the user to search for related users. Similarly, using machine learning increases the accuracy of the pre-indexing process. Also, because users need not search for the related users, this cuts down on the user interface processing and rendering and thus further improves machine performance.

Similarly, it is not uncommon for the sender to provide an attachment to the message. Attachments can include such things as documents, images, links, etc. However, this normally requires the author of the message to manually search for and locate the correct attachment to be sent to the recipients. Some computing systems allow the author of the message (who is authoring a message on a particular device) to actuate an attachment actuator and then the system automatically suggests the most recently used or edited documents on that particular device, as the attachment. Such suggestions are often unuseful in that the suggested documents are not the attachments desired by the user. For instance, if the author is authoring a work-related message on a personal mobile device, the system may suggest personal attachments because those were the attachments that were most recently accessed on the personal mobile device.

The present discussion thus also proceeds with respect to a system that receives message information about the message being authored. The message information can include the subject and body of the message, along with user information, context information, and other information. The system then identifies a possible attachment that is correlated to the message, information and suggests the possible attachment (e.g., the document, link, image, etc.) as a suggested attachment to the message. When the author of the message interacts with the suggestion (such as to accept or dismiss the suggestion), that interaction is fed back to improve the suggestion process.

FIG. 1 is a block diagram of a computing system architecture 100 in which computing system 102 can be accessed by user devices 104-106 a. User devices 104 and 106 can be used by users 108 and 110 in order to generate and receive messages. User devices 104 and 106 can, for example, be smartphones, tablet computers, or other mobile devices, desktop computers, laptop computers, etc.

FIG. 1 shows that user device 104 generates user interfaces 112 for interaction by user 108. User 108 can interact with user interfaces 112 in order to control and manipulate user device 104 and some portions of computing system 102. FIG. 1 also shows that user device 106 can generate user interfaces 114 for interaction y user 110. User 110 can interact with user interfaces 114 in order to control and manipulate user device 106 and some portions of computing system 102.

Computing system 102 can include one or more processors or servers 116, message service 118, message persistent system 120, message data store 122, raw user data store 124, topic extraction system 126, inference engine 128, augmentation service 130, inference data store 132, and other functionality 134. Before describing the overall operation of architecture 100, a description of some of the items in computing system 102, and their operation, will first be provided. Processors and servers 116 can host message service 118 which may be an email system, a chat system, a meeting system, a calendar system, another conversation system, etc. Message service 118 exposes an interface which can be accessed by user devices 104 and 106 so that users 108 and 110 can send and receive messages to one another using message service 118. When messages are sent, message persistence system 120 stores those messages in message data store 122.

As users 104 and 106 are interacting with message service 118, and other elements of computing system 102, raw data is being transmitted from the user devices 104 and 106 and stored in raw user data store 124. The raw user data can include data identifying the users 108 and 110, message data which can include the subject of messages, participants or recipients of the message, the body of the message, and documents or links to documents that are attached, context data, such as the time and location of the user, the particular device that the user is using, the time of day when the activity is occurring, the different applications that the user has used, etc. The user data can also include webpages that the user has accessed, among other information indicative of the activity of the users.

Inference engine 128 accesses the raw user data in data store 124 and generates inferences based upon that data. For instance, inference engine 128 can run semantic understanding algorithms, natural language understanding algorithms, and other algorithms (such as neural networks, Bayesian classifiers, and other algorithms) to identify topics and other entities (such as users, locations, etc.) in the raw data and to identify correlations among those entities. The correlations can be used to generate inferences, which indicate that certain users are related to certain topics, certain users are related to certain locations and applications, certain documents are related to different users, etc. The inferences 136 can be stored in a wide variety of different forms, such as in logical forms, maps or other structures that generate links between users and topics or other information, structures that have links between different documents and other entities, etc. Inference data store 132 illustratively stores user inferences 138 that show relationships of various different entities to different users and attachment inferences 140 that represent relationships between attachments and various different entities, as well as a wide variety of other inferences 142.

When a user (such as user 108) begins authoring a message through message service 118, message information 144 is provided to suggestion service 130. The message information 144 may include the subject of the message, the context information for user 108 who is authoring the message, the body of the message, the application and device used by user 108, and other message information 144. Augmentation service 130 includes mention augmentation service 146, attachment augmentation service 148, and it can include other functionality 150. Mention augmentation service 146 provides the message information 144 to topic extraction system 126 which extracts topics or other context data (collectively referred to herein as "topics") from the message information. The topics are returned to augmentation service 130. The topics are then provided to inference data store 132 to obtain any inferences that match the identified topics. For instance, mention augmentation service 146 may provide the topics to inference data store 132 to obtain user inferences 138 that match the topics. Again, the user interfaces 138 may represent users linked to different topics. Attachment augmentation service 148 can provide the topics to inference data store 132 to identify attachment inferences 140 that match the topics. Again, the attachment inferences 140 may represent attachments linked to different topics.

Mention augmentation service 146 can then process the inferences to identify users which may be returned as augmentation 154 which suggest a user as an "@mention" suggestion to message service 118. Attachment augmentation service 148 can provide suggestion 154 which may be an attachment identifier identifying an attachment (document, link, image, etc.) that is suggested for attachment to the message. Message service 118 then surfaces the suggestion for the authoring user (the sender) 108. Message service 118 can detect user interactions with the suggestions. For instance, the augmentation may be displayed as a user actuatable element that the user can actuate to accept or dismiss the suggestion. The user interaction is provided as feedback 160 to inference engine 128, topic extraction system 126, and suggestion service 130 in order to improve the accuracy of the inference generation, topic extraction, and augmentation operations, respectively.

Figure 2A:
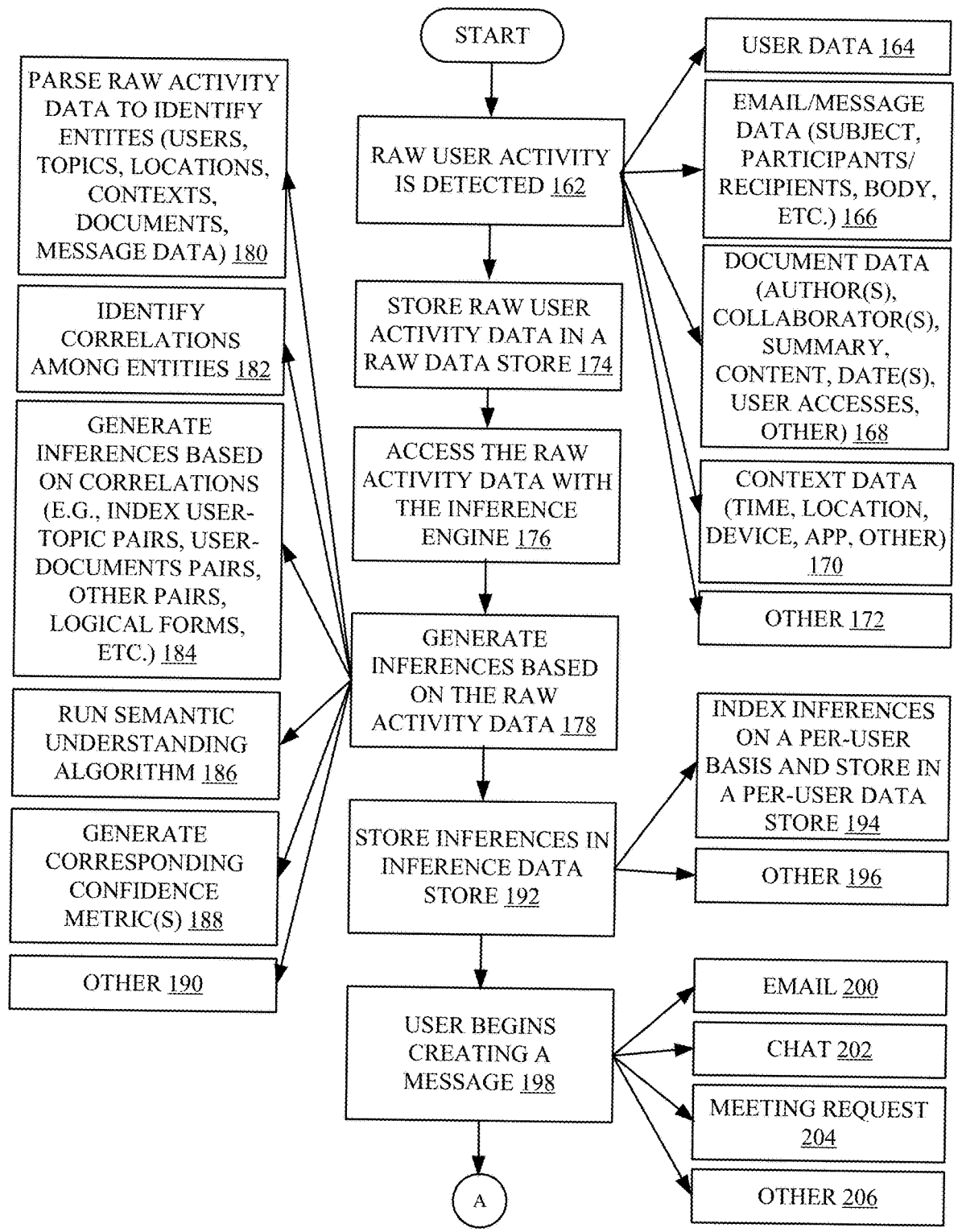
FIGS. 2A, 2B and 2C show a flow diagram illustrating one example of the operation of the computing system and an augmentation service illustrated in FIG. 1.
Figure 2B:
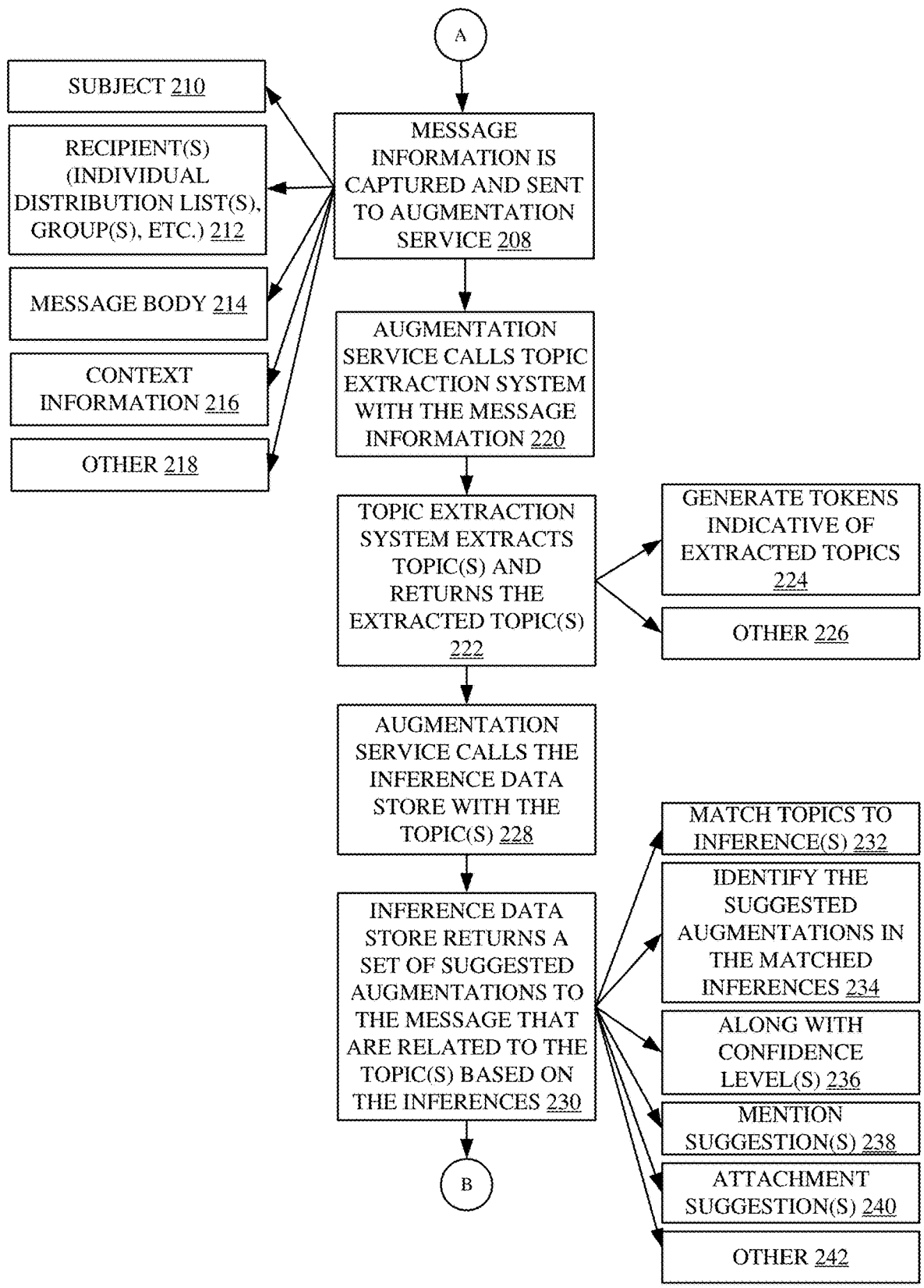
Figure 2C:
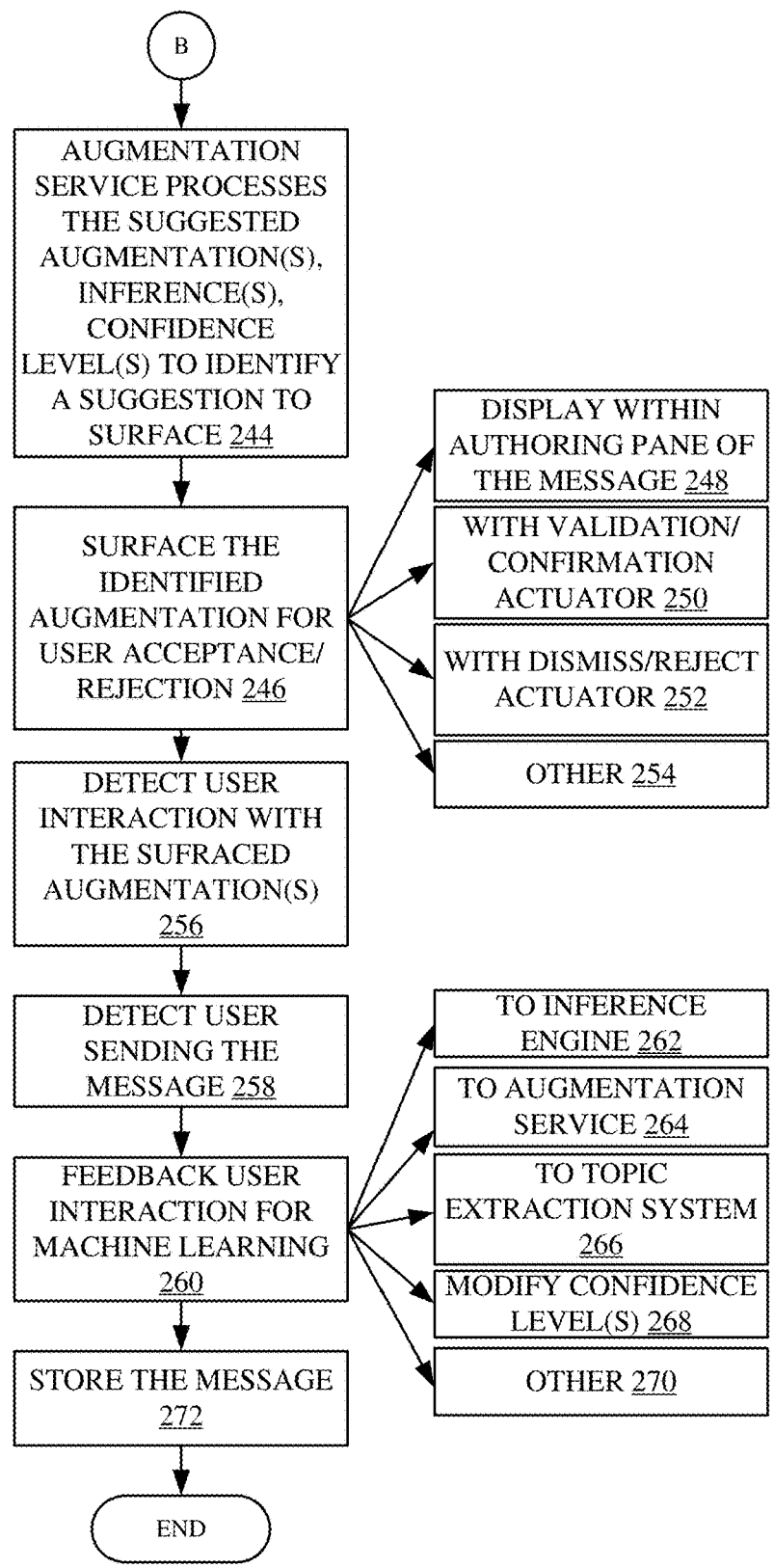

FIGS. 2A, 2B and 2C show a flow diagram illustrating one example of the operation of the computing system architecture 100 shown in FIG. 1 in generating the raw user activity data indicative of the detected activity so that the data can be stored. Detecting the raw user activity is indicated by block 162 in the flow diagram of FIG. 2A. The raw user activity data can be user data 164 that identifies the user, the user's profile, etc. The activity data can be message data 164 which may include the subject of the message, participants or recipients of the message, the body of the message, etc., as indicated by block 166. The activity data can be attachment data about possible attachments, such as document links, images, etc. As an example, the activity data can be document data, such as data about documents that the user has authored, collaborators on the different documents, document content, document interaction dates, documents that the user has accessed, among other document data, as indicated by block 168. The user activity data can include context data, such as the time of day when the user is performing different activities, the location of the user or user device upon which the activities are being performed, the particular device being used, applications being accessed by the user, and other context data 170. The user activity data can be a wide variety of other data 172 as well. The detected user activity can be detected by a computing system component on user device 104 or message service 118 or another element of computing system 102, or by a combination of those items. The raw user activity data is stored in raw user data store 124, as indicated by block 174 in the flow diagram of FIG. 2A.

Inference engine 128 then accesses the raw activity data in data store 124, as indicated by block 176, and generates inferences based upon the raw activity data, as indicated by block 178. Inference engine 128 can parse the raw activity data and run semantic understanding algorithms, natural language understanding algorithms, classifiers, and other algorithms, to identify entities in that data. Inference engine 128 may also provide the raw activity data to topic extraction system 126 which extracts the topics or other entities. The entities may include noun phrases or other linguistic elements that represent such things as users, topics, locations, contexts, documents, message data, links, images, among other entities, as indicated by block 180. Inference engine 128 then identifies correlations among the identified entities, as indicated by block 182 in the flow diagram of FIG. 2. The correlations can be generated using a semantic or natural language understanding algorithm classifier(s), such as a Bayesian or neural network classifier, or other classification systems. The correlations can indicate a relationship between entities, a type of the relationship, a strength of the relationship, etc. The correlations may also include a confidence level indicative of how confident the inference engine 128 is in the inference or correlation. The inference engine 128 can use other algorithms or mechanisms for generating inferences, such as correlations between the various entities as well. Once the correlations are known, inference engine 128 may generate inferences rankings based on those correlations, as indicated by block 184. The inferences can be arranged as pairs of entities, such as user-topic pairs that pair users with topics the users are correlated to, along with a score indicating how strong the correlation is and a confidence level. The correlations can be embodied using logical forms or other forms of expression as well. The references can be generated and ranked using semantic understanding algorithms 186 and corresponding confidence metrics, as indicated by block 188. The inferences can be generated in a variety of other ways, using other functionality, as well, as indicated by block 190.

Inference engine 128 then stores the inferences 136 in inference data store 132, as indicated by block 192. Inference data store 132 can be a per-user data store 194, which stores data separately for individual users, or other data stores 196.

At some point one of the users 108 or 110 will begin creating a message. It is assumed for the sake of the present discussion that user 108 begins to author a message using message service 118. Generating a message is indicated by block 198 in the flow diagram of FIG. 2A. Again, the message can be an email message 200, a chat message 202, a meeting request 204, or another message 206.

As user 108 is authoring a message, message information is captured by message service 118 (or a different system) and sent to augmentation service 130, as indicated by block 208 in FIG. 2B. The message information can be the subject 210 of the message, recipients 212 (which can be individuals, distribution lists, groups, etc.), the body 214 of the message, context information 216, or other information 218.

The message information 144 is then provided from augmentation service 130 to topic extraction system 126, as indicated by block 220 in the flow diagram of FIG. 2B. The topic extraction system 126 extracts topics (or other entities) from the message information and returns those topics, as indicated by block 222. In one example, topic extraction system 126 generates tokens indicative of the extracted topics. The tokens may identify the topics, they may identify where the topics were derived from (e.g., subject, summary, body, context, etc.) or other information, as indicated by block 224. The topics can be extracted and returned in other ways as well, as indicated by block 226.

The suggestion service 130 then calls the inference data store 132 with the topics returned from topic extraction system 126. Calling the inference data store is indicated by block 228 in the flow diagram of FIG. 2B.

The inference data store 132 can be a database or other type of data store which receives the set of topics and returns a set of suggested augmentations to the message being authored by user 108. The suggested augmentations are related to the topics based upon the inferences in inference data store 132. Returning a set of suggested augmentations is indicated by block 230 in the flow diagram of FIG. 2B. In one example, inference data store 132 matches the topics received from augmentation service 130 to the inferences (e.g., user inferences 138, attachment inferences 140, or other inferences 142) to identify matching inferences, as indicated by block 232. Inference data store 132 identifies the suggested augmentations from the matched inferences, as indicated by block 234. Inference data store 132 can also return the strengths of correlations upon which the inferences are based and confidence levels or confidence scores corresponding to the suggested augmentations, as indicated by block 236. In an example where mention augmentation service 146 is generating suggested "@mentions", then inference data store 132 returns suggested users that can be included in the "@mentions" using user inferences 138, as indicated by block 238. For instance, if a topic provided to inference data store 132 is "bocce ball" and data store 132 contains a highly ranked inference "bocce ball→John Doe", then inference data store may return "John Doe" as a suggested @mention for the textual portion of the message that mentions "bocce ball." This is just one example.

Where attachment augmentation service 148 is suggesting attachments to the message, then inference data store 132 can return suggested augmentations as suggested attachments using attachment inferences 140, as indicated by block 240. The inference data store can return the set of suggested augmentations based on the inferences in other ways as well, as indicated by block 242.

The suggestion service 130 then processes the suggested augmentations received from inference data store 132, the corresponding scores, confidence levels, the inferences themselves, and/or any other relevant information to identify a augmentation 154 as a suggested augmentation to the message that is to be surfaced to the user 108 who is authoring the message. Processing the suggested augmentations to identify a suggestion is indicated by block 244 in the flow diagram of FIG. 2C.

The augmentation 154 is returned to message service 118 which surfaces the identified augmentation for user acceptance or dismissal as indicated by block 246. The augmentation may be displayed within the authoring pane of the message, as indicated by block 248. The augmentation may be displayed with an acceptance/confirmation actuator 250 that can be actuated by the authoring user 108 to accept the augmentation for incorporation into the message. The augmentation can be surfaced with a dismiss or reject actuator 252 that can be actuated by the authoring user 108 to reject the augmentation so that it is not included in the message. The augmentation can be surfaced for validation, confirmation, or rejection in other ways as well, as indicated by block 254.

Message service 118 then detects user interaction with the surfaced augmentation, as indicated by block 256. For instance, message service 118 can detect whether the user 118 has accepted or rejected the augmentation. Message service 118 also detects user 108 sending the message using message service 118, as indicated by block 258. The detected user interaction with the augmentation can be output by message service 118 as user interaction feedback 160, which can be provided to other items in computing system 102 for machine learning, in order to improve their accuracy, as indicated by block 260. For instance, the feedback 160 can be provided to inference engine 128, for machine learning to improve the inference generation, as indicated by block 262. The feedback 160 can be provided to augmentation service 130 for machine learning to improve the augmentations, as indicated by block 264. The feedback 160 can be provided to topic extraction system 126 for machine learning to improve topic extraction, as indicated by block 266. The feedback 160 can also be provided to inference data store 132 or another item so that the confidence scores corresponding to the inferences, or augmentations, can be modified based upon feedback 160 as well, as indicated by block 268. The feedback can be provided for other machine learning operations as well, as indicated by block 270.

Once the message is sent, message service 118 provides the message (with the suggested augmentation incorporated (when it is accepted by user 108) or without it (when it is rejected by user 108) to message persistence system 120 which persists the message and stores it in message data store 122. Storing the message is indicated by block 272 in the flow diagram of FIG. 2C.

Figure 2D:
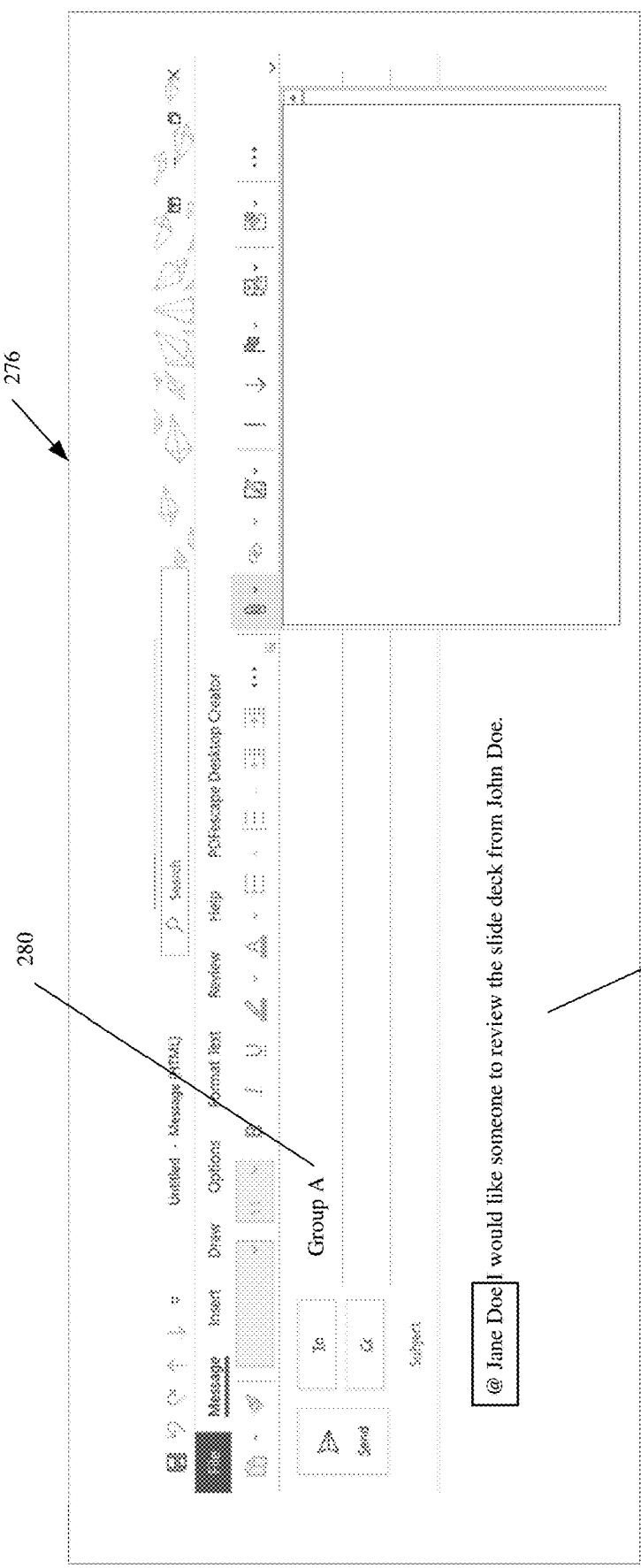
FIGS. 2D and 2E show examples of user interface displays.

FIG. 2D shows one example of a user interface display 276 in which message system 118 is an email system and a user (such as user 108) is authoring an email message by entering content into an authoring pane 278. The email message is being sent to a group of recipients identified at 280. In the example, user 108 would like one of the recipients to review a slide deck from an author "John Doe", but user 108 does not know who in group A should be reviewing that slide deck. Therefore, user 108 has typed "I would like someone to review the slide deck from John Doe."

In the example shown in FIG. 2D, message information 144 (in the block diagram of FIG. 1) includes the body of the message in authoring pane 278 and the recipients of the message (and possibly other information) and the message information 144 is sent to mention augmentation service 146. Mention augmentation service 146 accesses topic extractor 126 which extracts topics from the message information 144 and then provides the topics to inference data store 132 where inferences are identified based on those topics. The topics may include the slide deck from John Doe, the recipient group A (which includes a list of individuals including "Jane Doe") among other topics. The inferences in data store 132 may show that the slide deck from John Doe is directed toward a specific subject matter. The inferences may also show that "Jane Doe" is correlated to that specific subject matter. Therefore, inference data store may return "Jane Doe" as a possible augmentation. Mention augmentation service 146, based upon the returned users from inference data store 132, may suggest "@JaneDoe" as an "@mention" augmentation to be added to the email message 278 being generated by user 108. In that case, the "@JaneDoe" text in message 278 is surfaced for user 108 and highlighted as a suggestion.

User 108 can then accept the augmentation or dismiss the augmentation. If the augmentation is accepted, then the "@mention" of "@JaneDoe" is inserted into the email message. If the augmentation is rejected or dismissed, it is not included in the email message. Either way, the user interaction of accepting or dismissing the augmentation is fed back to computing system 102 to enhance the accuracy of the various functionality in computing system 102.

Figure 2E:
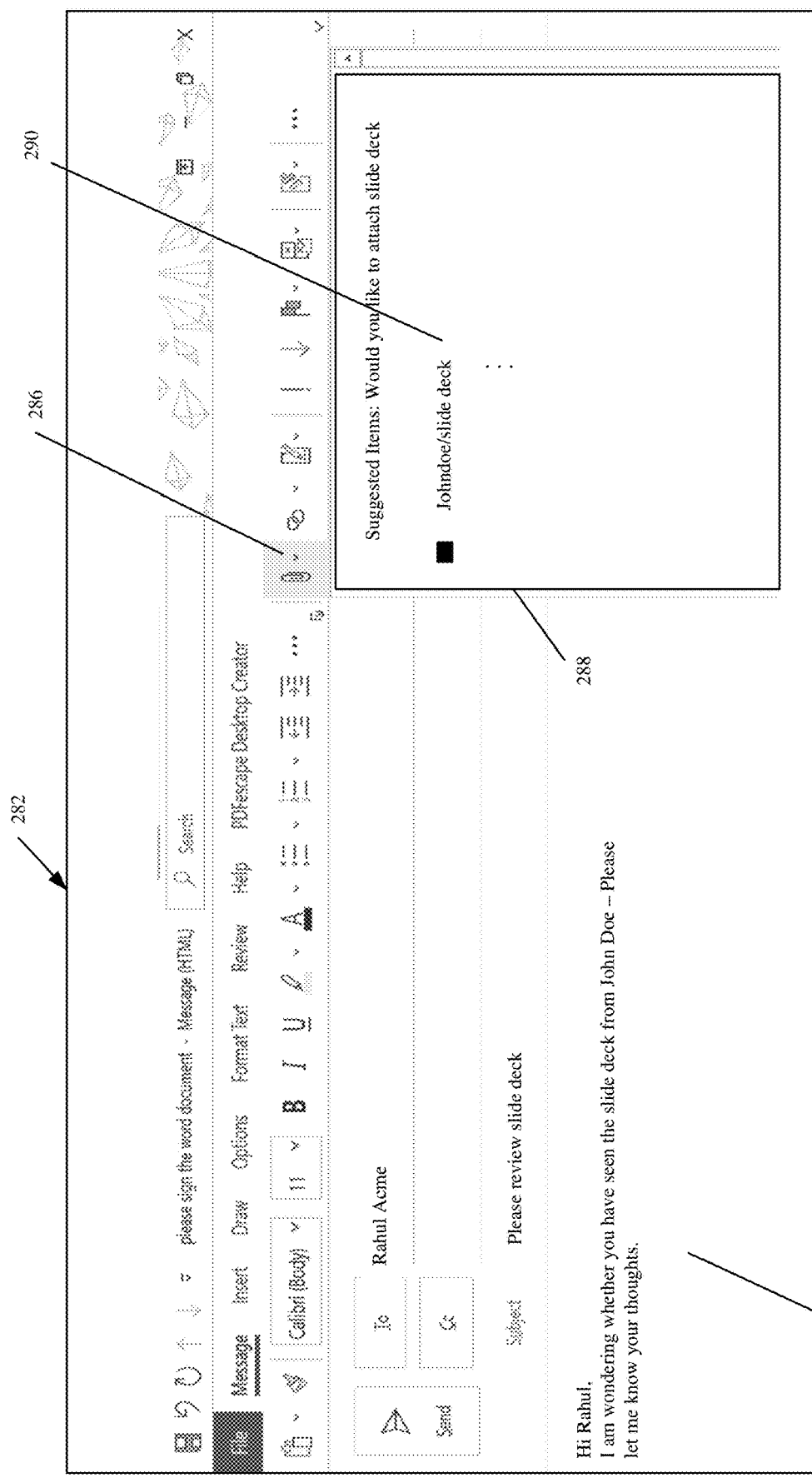

FIG. 2E shows an example of another user interface display 282 in which user 108 is writing an email message to a recipient by entering text into authoring pane 284. The text is "I am wondering whether you have seen the slide deck from John Doe. Please let me know your thoughts." During the authoring of the email message, message information 144 is sent to augmentation service 130. Attachment augmentation service 188 sends the message information to topic extraction system 126 which extracts topics from the content of the message. One of the topics may be "the slide deck from John Doe. That topic is then submitted to inference data store 132 which uses it to access attachment inferences 140 to find any inferences that match the topic "the slide deck from John Doe". The attachment inferences 140 may include an inference that relates John Doe to a particular slide deck. In that case, attachment augmentation service 148 returns an augmentation 154 which is a link to that slide deck to message service 118, which surfaces the augmentation for user 108. In the example shown in FIG. 2E, the augmentation is surfaced by highlighting the attachment actuator 286 and showing a drop-down menu 288 that includes the link 290 to a slide deck correlated to John Doe. User 108 can either accept or reject the augmentation by actuating an actuator (such as the link itself or a different actuator). If the augmentation is accepted, then the suggested slide deck is attached to the email message before it is sent.

After the messages in FIGS. 2D and 2E are sent, they are sent to message persistence system 120 which stores those messages (either with or without the suggested augmentations) to message data store 122.

Figure 3:
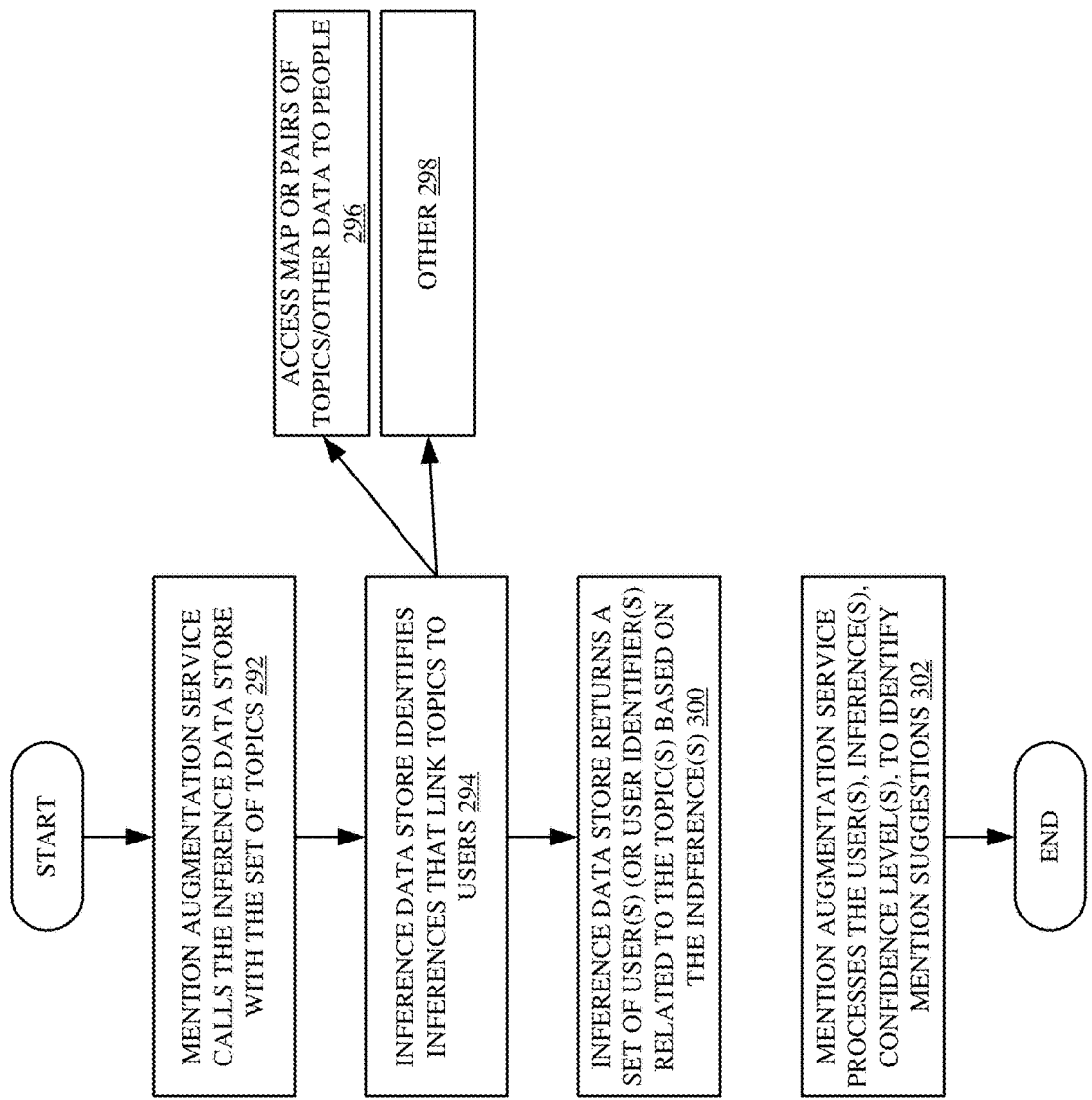
FIG. 3 is a flow diagram illustrating the operation of a computing system in which the suggested addition is a "@mention" suggestion.

FIG. 3 is a flow diagram showing one example of the operation of mention augmentation service 146 in more detail. It is first assumed that the topic extraction system 126 has extracted topics from the message information 144 and provided those topics to mention augmentation service 146. Mention augmentation service 146 then calls the inference data store 132 with the set of topics, as indicated by block 292 in the flow diagram of FIG. 3. Inference data store 132 accesses the user inferences 138 to identify inferences that link topics to users, as indicated by block 294. The user inferences 138 may be embodied as a map or as pairs of topics or structures that correlate other data to different people. Accessing the maps or correlations that pair topics or other information to users is indicated by block 296 in the flow diagram of FIG. 3. The data store can identify inferences that link topics or other information to users in other ways as well, as indicated by block 298.

Inference data store 132 then searches the user inferences 138 (and possibly other inferences) and returns a set of users (or user identifiers that identify users) related to the topic or topics that were provided to inference data store 132, based upon the user inferences 138. Returning the set of users or user identifiers based upon the inferences 138 is indicated by block 300 in the flow diagram of FIG. 3.

Mention augmentation service 146 then processes the set of users, the inferences, the confidence levels, and/or any other information to identify mention augmentations that can be provided as augmentations 154 back to message service 118 for surfacing to the user 108 authoring the message. Providing the @mention augmentations is indicated by block 302 in the flow diagram of FIG. 3. In one example, mention augmentation service 146 processes the list of users by ranking them in terms of confidence level, or correlation scores, or other metrics and provides the highest ranked user as an @mention augmentation. Mention augmentation service 146 can process the list of users in other ways as well.

Figure 4:
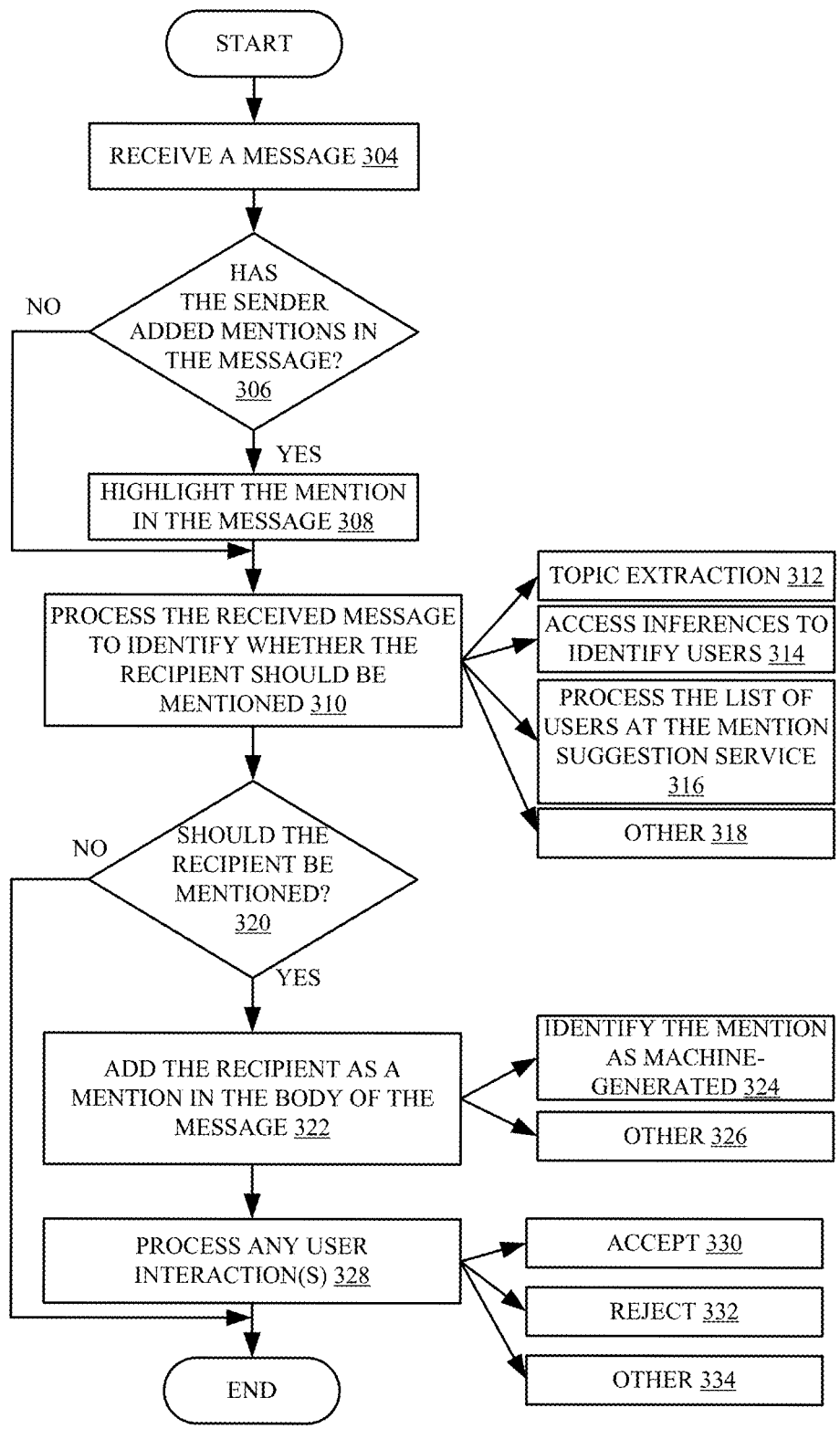
FIG. 4 is a flow diagram illustrating one example of the operation of the computing system in generating suggested augmentations for a particular recipient.

FIG. 4 is a flow diagram illustrating one example of the computing system 102 in processing a message that is received by a recipient user, such as user 110. The message will be described herein as a message that is authored by user 108 and sent to user 110 through message service 118. Message service 118 thus first receives the message (such as by user 108 actuating a "send" actuator to send the message). Receiving the message at message service 118 is indicated by block 304 in the flow diagram of FIG. 4. Message service 118 then detects whether the sender has added an @mention in the message, as indicated by block 306. If so, message service 118 highlights the @mention in the message when it is surfaced for user 110, as indicated by block 308.

Message service 118 also processes the received message to identify whether the recipient 110 should be mentioned in an "@mention", based upon the message information, such as the sender 108, the content of the message, etc. Processing the received message is indicated by block 310. The message can be processed to determine whether the recipient 110 is to be mentioned as a "@mention" in the message body in a similar way as described above with respect to FIGS. 2 and 3 for identifying "@mention" augmentations in a message that is being authored by user 108. For instance, the message information 144 can be provided to mention augmentation service 146 which sends the message information to topic extraction system 126 for topic extraction, as indicated by block 312. The identified topics can be sent from mention augmentation service 146 to inference data store 132 which identifies a set of users by accessing user inferences 138 based upon the identified topics. Accessing the inferences to identify users is indicated by block 314. Mention augmentation service 146 can then process the set of users returned by inference data store 132 to determine whether the recipient user 110 should be mentioned as an "@ mention" user in the message. Processing the users with a mention augmentation service is indicated by block 316 in the flow diagram of FIG. 4. The message can be processed to identify whether recipient user 110 should be mentioned in the body of the message in other ways as well, as indicated by block 318.

If the recipient user 110 should be mentioned as an "@mention" in the body of the message, that will be returned as a augmentation 154 from mention augmentation service 146, as indicated by block 320 in the flow diagram of FIG. 4. In that case, the recipient 110 will be added as an "@ mention" in the body of the message, as indicated by block 322. In one example, message service 118 inserts that @mention and specifically identifies the @mention as a machine-generated @mention, as indicated by block 324. The @mention can be identified as a machine-generated @mention in a wide variety of different ways, such using a textual indicator, highlighting, or other visual or audible mechanisms for identifying it as being machine-generated. The recipient 110 can be added as an @mention in the body of the message in other ways as well, as indicated by block 326.

The recipient user 110 may then interact with the @mention augmentation by accepting it, dismissing it, etc. Any user interactions are processed and fed back as user interaction feedback 160 as indicated by block 328. Again, the interactions may be to accept the augmentation as indicated by block 330, to dismiss the augmentation as indicated by block 332, to provide an alternative or other interactions, as indicated by block 334.

Figure 5:
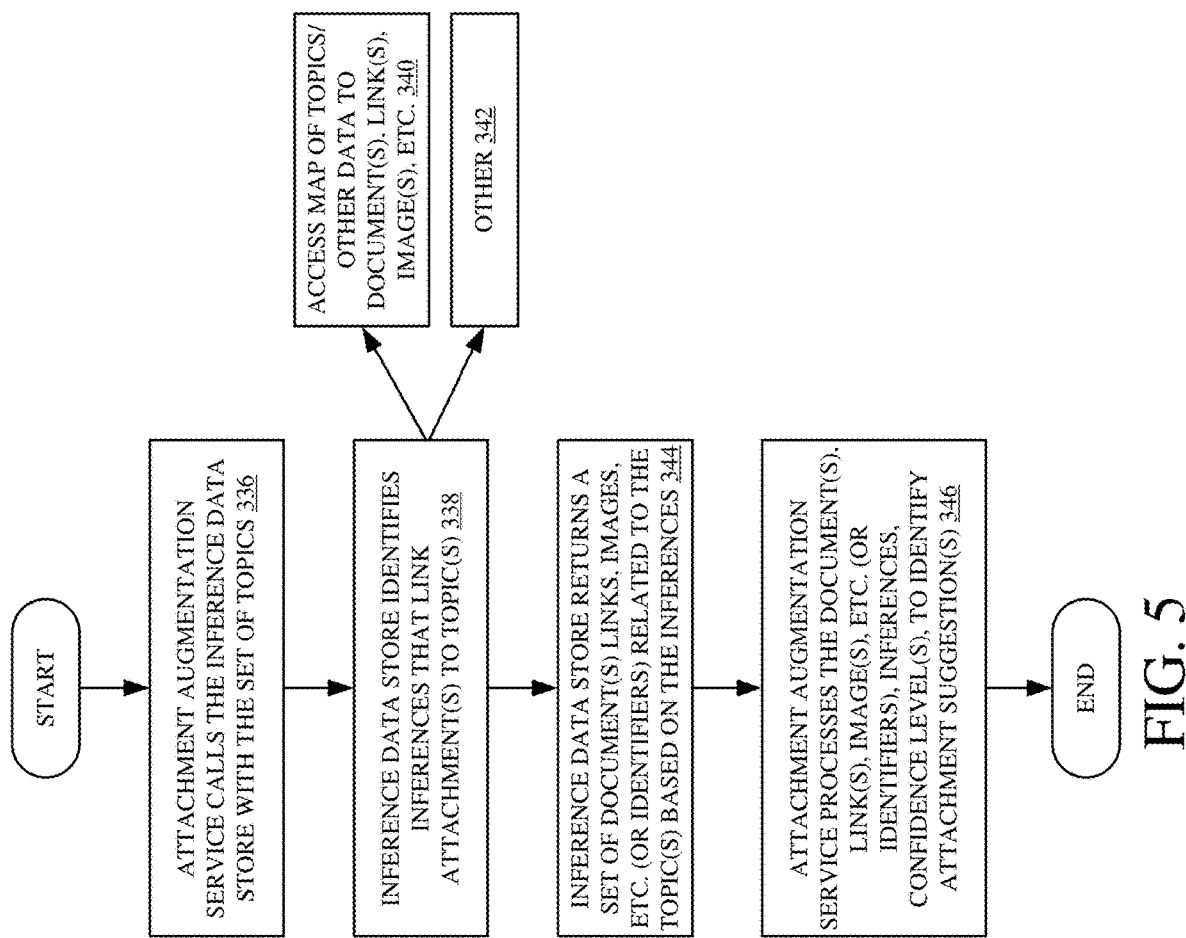
FIG. 5 is a flow diagram illustrating the operation of a computing system in which the suggested augmentation is a suggested attachment.

FIG. 5 is a flow diagram illustrating one example of the operation of attachment augmentation service 148 in more detail. It is assumed first that the message information 144 has been provided to topic extraction system 126 so that topics have been extracted from it and provided to attachment augmentation service 148. Attachment augmentation service 148 then calls the inference data store 132 with the set of topics, as indicated by block 336 in the flow diagram of FIG. 5. Inference data store 132 identifies inferences (such as attachment inferences 140) that link documents to the topics sent by attachment augmentation service 148. Identifying the inferences is indicated by block 338 in the flow diagram of FIG. 5. In identifying the inferences, inference data store 132 can access a map or other data structures that pair topics and other information to documents, links, images, or other attachments, as indicated by block 340. Inference data store 132 can identify inferences in other ways as well, as indicated by block 342.

Inference data store 132 then returns a set of documents, links, images, or other attachments (or attachment identifiers) that are related to the topics based upon the identified inferences, as indicated by block 344. The attachment augmentation service 148 then processes the documents, links, images or other augmentations (or their identifiers) along with inferences and/or confidence levels or other information to identify attachment augmentations which are sent as augmentations 154 to message service 118 for surfacing to the authoring user 108, as indicated by block 346. It should also be appreciated that, as with "@ mentions" discussed above with respect to FIG. 4, different attachments can be suggested for different recipients, by processing the message received by the recipients in addition to, or instead of, suggesting attachments when the message is being authored.

It can thus be seen that the present discussion describes a system which pre-indexes users and attachments to different topics that can be extracted from messages and message information. Augmentations can be generated for additions that may be added to the message when it is being authored. In addition, augmentations can be generated which can be added to the message once it is received or as it is received by a recipient. Thus, the message that is actually sent by the sender may be different for each recipient, because different mentions, attachments, etc. can be suggested and inserted into the message for individual recipients.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. The displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, they can be actuated using touch gestures. Also, where the device that displays them has speech recognition components, the mechanisms can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
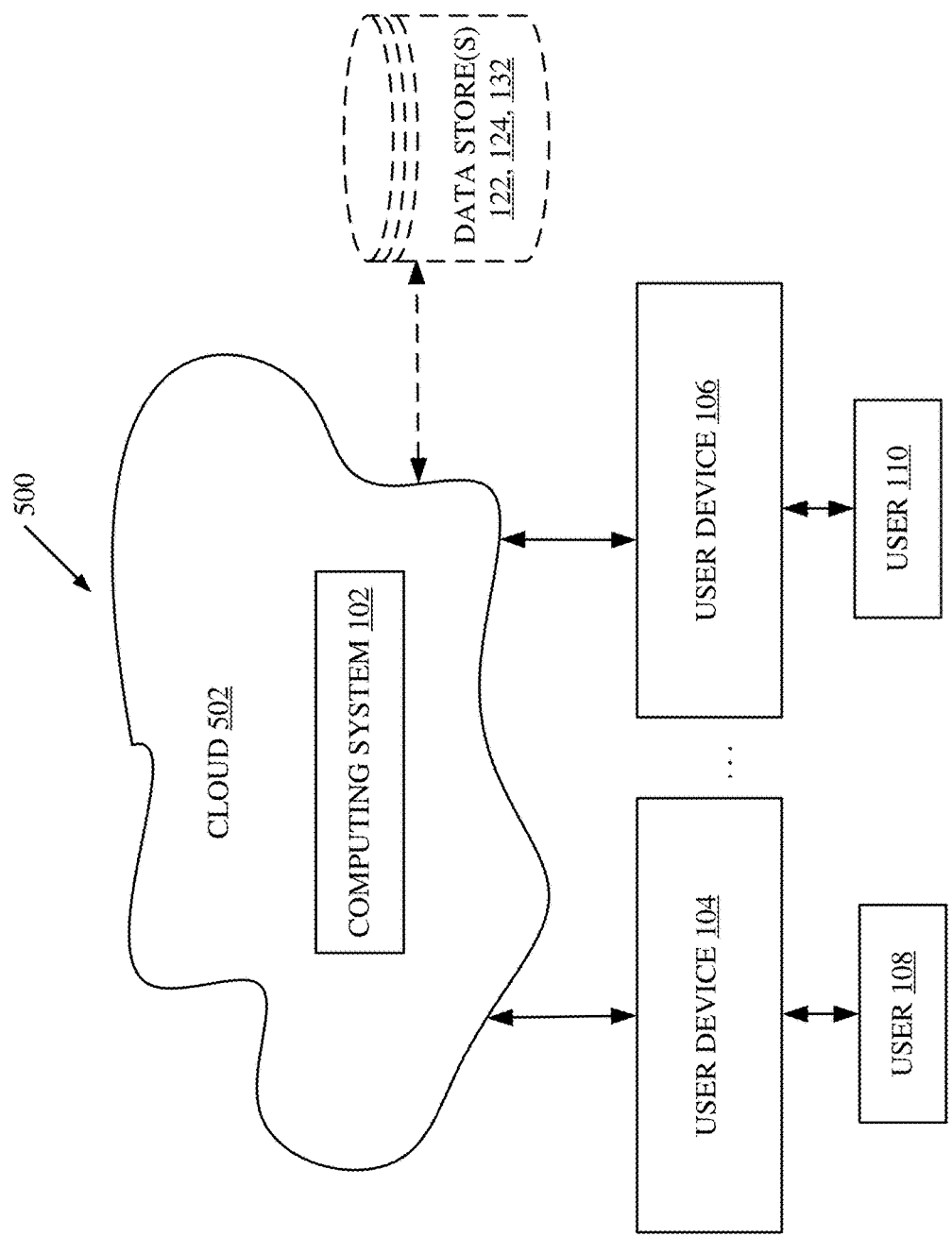
FIG. 6 is a block diagram showing one example of a computing system in a remote server architecture.

FIG. 6 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 6, some items are similar to those shown in FIG. 1 and they are similarly numbered. FIG. 6 specifically shows that computing system 102 can be located in cloud 502 (which can be public, private, or a combination where portions are public while others are private). Therefore, users 108 and 110 uses a user devices 104 and 106 to access those systems through cloud 502.

FIG. 6 also depicts another embodiment of a cloud architecture. FIG. 6 shows that it is also contemplated that some elements of computing system 102 can be disposed in cloud 502 while others are not. By way of example, data stores 122, 124, 132 can be disposed outside of cloud 502, and accessed through cloud 502. Regardless of where the items are located, they can be accessed directly by devices 104 and 106, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
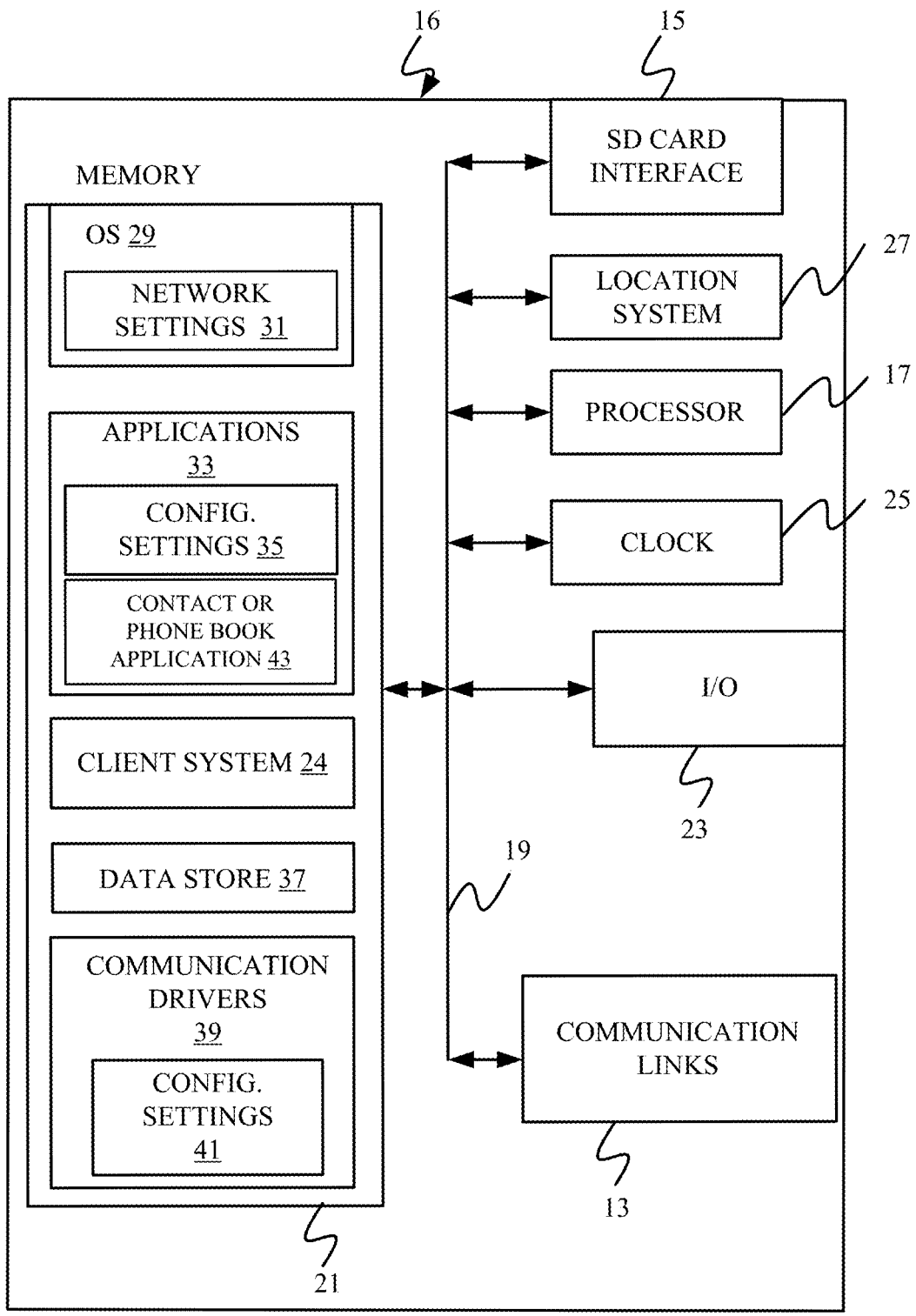
FIGS. 7-9 show examples of mobile devices that can be used in architectures and systems shown in other figures.
Figure 8:
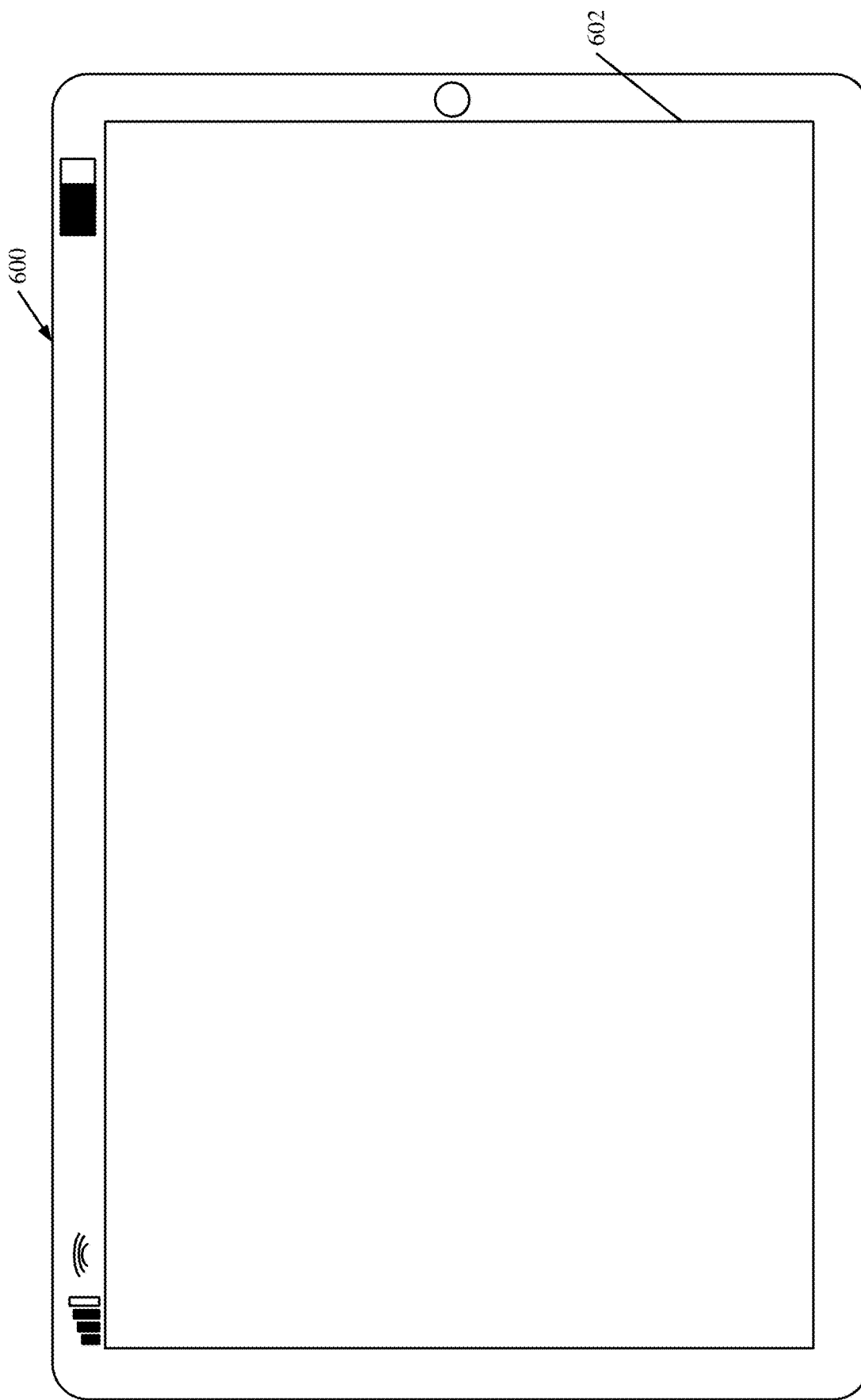
Figure 9:
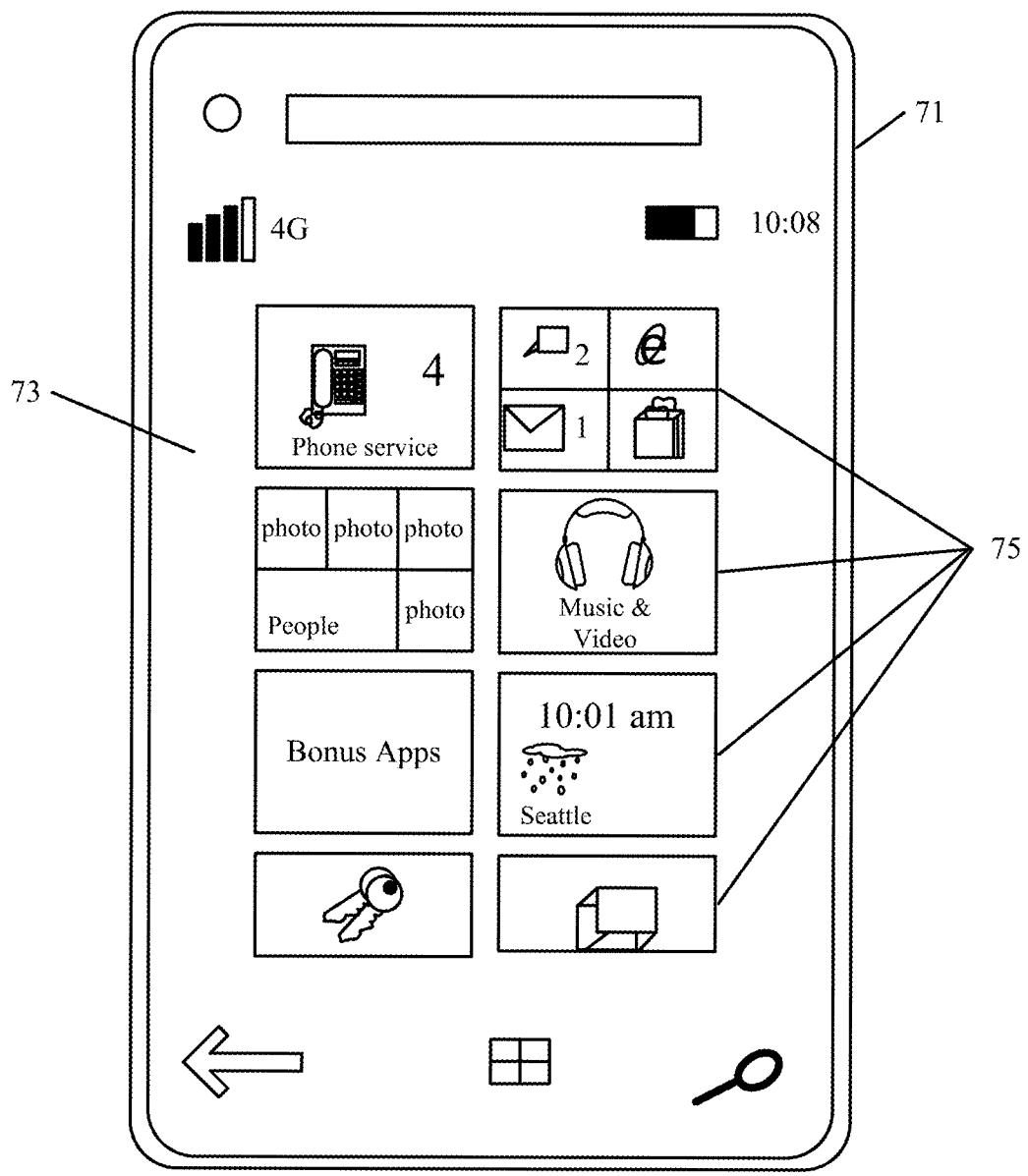

FIG. 7 is a simplified block diagram of one illustrative example of a handheld or mobile computing device that can be used as a user's or client's hand held device 16, in which the present system (or parts of it) can be deployed. FIGS. 8-9 are examples of handheld or mobile devices.

FIG. 7 provides a general block diagram of the components of a client device 16 that can run components computing system 102 or user devices 104-106 or that interacts with architecture 100, or both. In the device 16, a communications link 13 is provided that allows the handheld device to communicate with other computing devices and under some examples provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 8 shows one example in which device 16 is a tablet computer 600. In FIG. 8, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 9 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
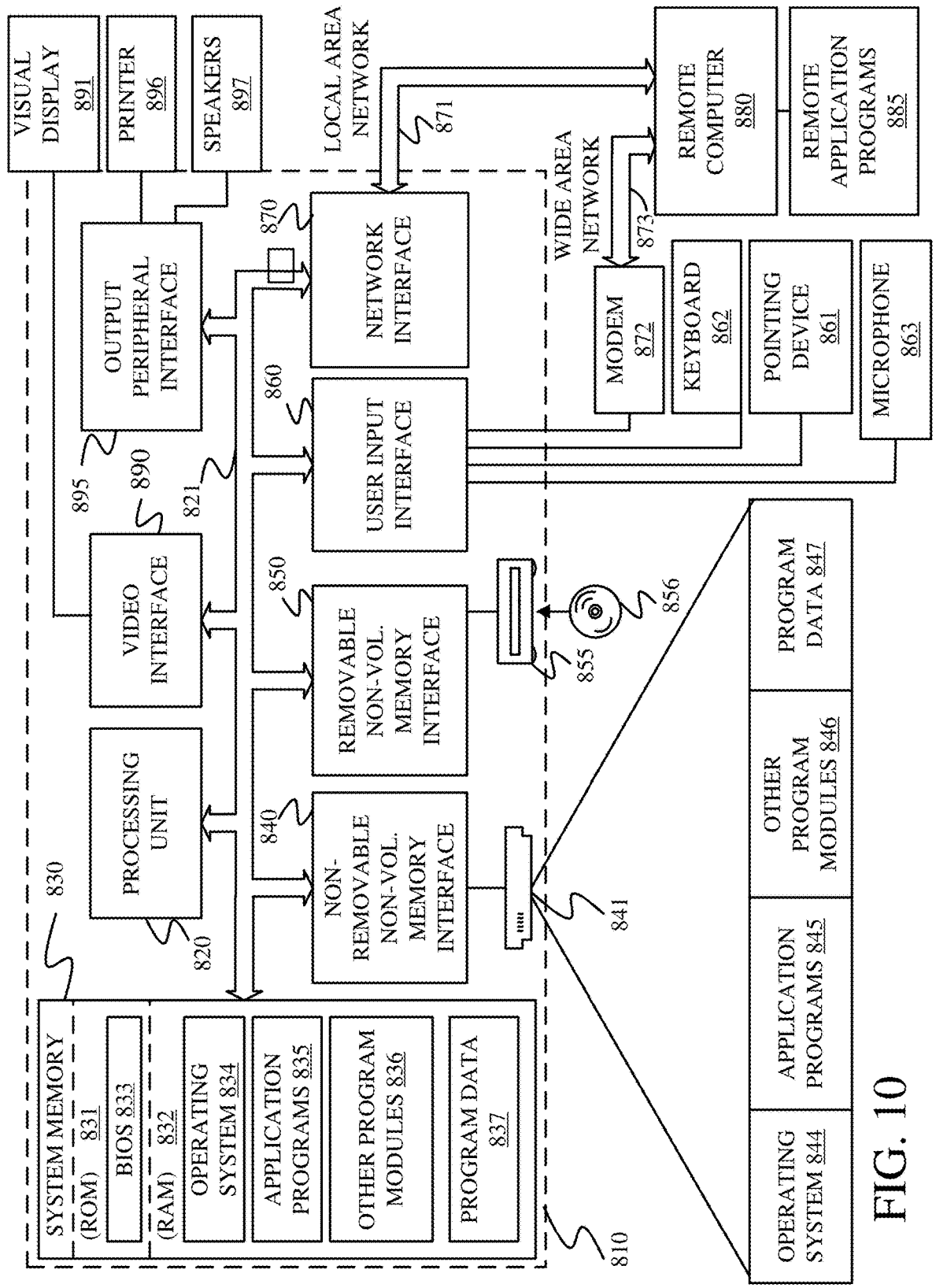
FIG. 10 is a block diagram of a computing environment that can be used in architectures and systems shown in other figures.

FIG. 10 is one example of a computing environment in which architecture 100, or parts of it, (for example) can be deployed. With reference to FIG. 10, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 10 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computer system, comprising:
at least one processor; and
a data store that stores instructions which, when executed by the at least one processor, cause the at least one processor to perform steps comprising:
receiving message information, including message content to be included in a message generated by a message service;
identifying an entity in the message information;
accessing a user-specific inference store that stores an inference that indicates a correlation between the entity and an augmentation to the message;
identifying the augmentation to the message based on the inference; and
sending an indication of the augmentation to the message to the message service.

Example 2 is the computer system of any or all previous examples wherein receiving message information comprises:
receiving user data identifying a first user who is authoring the message; and
receiving context information indicative of a context in which the message is generated.

Example 3 is the computer system of any or all previous examples wherein identifying an entity in the message information comprises:
identifying at least one of a user related to the message, a topic of the message, a location where the first user generates the message, or a document related to the message.

Example 4 is the computer system of any or all previous examples wherein the data store stores instructions which, when executed by the at least one processor, cause the at least one processor to perform steps further comprising:

detecting activity data indicative of activity of a plurality of different users;

for each given user of the plurality of different users generating a set of inferences that each indicate a correlation between the given user and an entity in the activity data; and storing the set of inferences for each given user in the user-specific inference store.

Example 5 is the computer system of any or all previous examples wherein identifying the augmentation to the message comprises:

identifying an attachment to the message as the augmentation to the message.

Example 6 is the computer system of any or all previous examples wherein sending an indication of the augmentation to the message to the message service for surfacing to the first user comprises:

displaying, as a suggestion, an interactive user identifier identifying the attachment to be attached to the message;

detecting user interaction of the first user with the interactive user identifier to accept or dismiss the suggestion; and if the user interaction indicates that the first user accepts the suggestion, then adding the attachment to the body of the message.

Example 7 is the computer system of any or all previous examples wherein identifying the augmentation to the message comprises:

identifying a user to be mentioned in a body of the message as the augmentation to the message.

Example 8 is the computer system of any or all previous examples wherein sending an indication of the augmentation to the message to the message service for surfacing to the first user comprises:

displaying, as a suggestion, an interactive user identifier identifying the user to be mentioned in the body of the message;

detecting user interaction of the first user with the interactive user identifier to accept or dismiss the suggestion; and if the user interaction indicates that the first user accepts the suggestion, then adding the user identifier to the body of the message.

Example 9 is the computer system of any or all previous examples wherein the data store stores instructions which, when executed by the at least one processor, cause the at least one processor to perform steps further comprising:

feeding back the detected user interaction to modify generation of the set of inferences based on the detected user interaction.

Example 10 is the computer system of any or all previous examples wherein the data store stores instructions which, when executed by the at least one processor, cause the at least one processor to perform steps further comprising:

detecting a send indication indicative of the message being sent to a recipient;

identifying an entity in the message information;

accessing the user-specific inference store based on the recipient;

identifying the augmentation to the message based on the inference; and sending an indication of the augmentation to the message to the message service for surfacing to the recipient.

Example 11 is a computer implemented method, comprising:

receiving message information including message content of a message generated by a message service;

identifying an entity in the message information;

accessing a user-specific inference store that stores an inference that indicates a correlation between the entity and an augmentation to the message;

identifying the augmentation to the message based on the inference; and sending an indication of the augmentation to the message to the message service.

Example 12 is the computer implemented method of any or all previous examples and further comprising:

detecting activity data indicative of activity of a plurality of different users;

for each given user of the plurality of different users generating a set of inferences that each indicate a correlation between the given user and an entity in the activity data; and storing the set of inferences for each given user in the user-specific inference store.

Example 13 is the computer implemented method of any or all previous examples wherein identifying the augmentation to the message comprises:

identifying an attachment to the message as the augmentation to the message.

Example 14 is the computer implemented method of any or all previous examples wherein sending an indication of the augmentation to the message to the message service for surfacing to the first user comprises:

displaying, as a suggestion, an interactive user identifier identifying the attachment to be attached to the message;

detecting user interaction of the first user with the interactive user identifier to accept or dismiss the suggestion; and if the user interaction indicates that the first user accepts the suggestion, then adding the attachment to the body of the message.

Example 15 is the computer implemented method of any or all previous examples and further comprising:

feeding back the detected user interaction to modify generation of the set of inferences based on the detected user interaction.

Example 16 is the computer implemented method of any or all previous examples wherein identifying the augmentation to the message comprises:

identifying a user to be mentioned in a body of the message as the augmentation to the message.

Example 17 is the computer implemented method of any or all previous examples wherein sending an indication of the augmentation to the message to the message service for surfacing to the first user comprises:

displaying, as a suggestion, an interactive user identifier identifying the user to be mentioned in the body of the message;

detecting user interaction of the first user with the interactive user identifier to accept or dismiss the suggestion; and if the user interaction indicates that the first user accepts the suggestion, then adding the user identifier to the body of the message.

Example 18 is the computer implemented method of any or all previous examples and further comprising:

feeding back the detected user interaction to modify generation of the set of inferences based on the detected user interaction.

Example 19 is the computer implemented method of any or all previous examples and further comprising:
  detecting a send indication indicative of the message being sent to a recipient;
  identifying an entity in the message information;
  accessing the user-specific inference store based on the recipient;
  identifying the augmentation to the message based on the inference; and
  sending an indication of the augmentation to the message to the message service for surfacing to the recipient.

Example 20 is a computer implemented method, comprising:
  receiving message content of a message generated by a message service;
  detecting a send indication indicative of the message being sent to a recipient;
  identifying an entity in the message information;
  accessing a user-specific inference store, specific to the recipient, that stores an inference that indicates a correlation between the entity and an augmentation to the message;
  identifying the augmentation to the message based on the inference;
  sending an indication of the augmentation to the message to the message service; and
  including the augmentation to the message when the message is rendered by the message service.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer system, comprising:
  at least one processor; and
  a data store that stores instructions which, when executed by the at least one processor, cause the at least one processor to perform steps comprising:
    receiving message information, including message content to be included in a message generated by a message service;
    identifying an entity in the message information in response to a means for inferring inferences parsing the message information and generating tokens indicative of the entity extracted from the message information;
    identifying a recipient associated with the message;
    accessing a user-specific inference store based on the recipient, wherein the user-specific inference store stores an inference identified by the means for inferring inferences that indicates a correlation between the entity and an augmentation to include in the message;
    identifying the augmentation based on the inference identified by the means for inferring inferences;
    providing a user interface, wherein the user interface includes a drop-down menu including a link to the augmentation;
    causing the augmentation that is linked in the drop-down menu to be attached to the message; and
    sending, to the message service, the augmentation attached to the message.

2. The computer system of claim 1 wherein receiving message information comprises:
  receiving user data identifying a first user who is authoring the message; and
  receiving context information indicative of a context in which the message is generated.

3. The computer system of claim 2 wherein identifying an entity in the message information in response to a means for inferring inferences parsing the message information comprises:
  identifying at least one of the recipient, a topic of the message, a location where the first user generates the message, or a document related to the message.

4. The computer system of claim 1 wherein the data store stores instructions which, when executed by the at least one processor, cause the at least one processor to perform acts further comprising:
  detecting activity data indicative of activity of a plurality of different users;
  for each given user of the plurality of different users, generating a set of inferences that each indicate a correlation between the given user and an entity in the activity data; and
  storing the set of inferences for each given user in the user-specific inference store.

5. The computer system of claim 4 wherein identifying the augmentation to include in the message comprises:
  identifying an attachment to the message as the augmentation to include in the message.

6. The computer system of claim 5 wherein sending of the augmentation to include in the message to the message service for surfacing to a first user comprises:
  displaying, as a suggestion, an interactive user identifier identifying the attachment to be attached to the message;
  detecting user interaction of the first user with the interactive user identifier to accept or dismiss the suggestion; and
  if the user interaction indicates that the first user accepts the suggestion, then causing the augmentation to be attached to the message includes adding the attachment to a body of the message.

7. The computer system of claim 4 wherein identifying the augmentation to include in the message comprises:
  identifying a user to be mentioned in a body of the message as the augmentation to include in the message.

8. The computer system of claim 7 wherein the user to be mentioned in the body of the message comprises the recipient.

9. The computer system of claim 7 wherein sending the augmentation to include in the message to the message services for surfacing to a first user comprises:
  displaying, as a suggestion, an interactive user identifier identifying the user to be mentioned in the body of the message;
  detecting user interaction of the first user with the interactive user identifier to accept or dismiss the suggestion; and
  if the user interaction indicates that the first user accepts the suggestion, then adding the user identifier to the body of the message; and
  the data store stores instructions which, when executed by the at least one processor, cause the at least one processor to perform steps further comprising:
    feeding back the detected user interaction to modify generation of the set of inferences based on the detected user interaction.

10. The computer system of claim 1 wherein the data store stores instructions which, when executed by the at least one processor, cause the at least one processor to perform steps further comprising:
  detecting a send indication indicative of the message being sent to a recipient;
  identifying the augmentation to include in the message based on the inference; and
  sending an indication of the augmentation to include in the message to the message service for surfacing to the recipient.

11. The computer system of claim 1, wherein the user interface further includes an actuator configured to be actuated by a first user who is authoring the message to accept or reject to include the augmentation in the message.

12. The computer system of claim 11, wherein upon receiving an actuation via the actuator, attaching the augmentation to the message.

13. A computer implemented method, comprising:
  receiving message information including message content of a message generated by a message service;
  identifying an entity in the message information in response to a means for inferring inferences parsing the message information and generating tokens indicative of the entity extracted from the message information;
  identifying a recipient associated with the message;
  accessing a user-specific inference store based on the recipient, wherein the user-specific inference store stores an inference identified by the means for inferring inferences that indicates a correlation between the entity and an augmentation to include in the message;
  identifying the augmentation based on the inference identified by the means for inferring inferences;
  providing a user interface, wherein the user interface includes a drop-down menu including a link to the augmentation;
  causing the augmentation that is linked in the drop-down menu to be attached to the message; and
  sending, to the message service, the augmentation attached to the message.

14. The computer implemented method of claim 11 and further comprising:
  detecting activity data indicative of activity of a plurality of different users;
  for each given user of the plurality of different users generating a set of inferences that each indicate a correlation between the given user and an entity in the activity data; and
  storing the set of inferences for each given user in the user-specific inference store.

15. The computer implemented method of claim 14 wherein identifying the augmentation to include in the message comprises:
  identifying an attachment to include in the message as the augmentation to include in the message.

16. The computer implemented method of claim 15 wherein sending an indication of the augmentation to include in the message comprises:
  displaying, as a suggestion, an interactive user identifier identifying the attachment to be attached to the message;
  detecting user interaction of the first user with the interactive user identifier to accept or dismiss the suggestion; and
  if the user interaction indicates that the first user accepts the suggestion, then adding the attachment to the body of the message.

17. The computer implemented method of claim 16 and further comprising:
  feeding back the detected user interaction to modify generation of the set of inferences based on the detected user interaction.

18. The computer implemented method of claim 16 wherein identifying the augmentation to include in the message comprises:
  identifying a user to be mentioned in a body of the message as the augmentation to include in the message.

19. The computer implemented method of claim 18 wherein the user to be mentioned in the body of the message comprises the recipient.

20. The computer implemented method of claim 18, wherein sending an indication of the augmentation to include in the message to the message service for surfacing to the first user comprises:
  displaying, as a suggestion, an interactive user identifier identifying the user to be mentioned in the body of the message;
  detecting user interaction of the first user with the interactive user identifier to accept or dismiss the suggestion; and
  if the user interaction indicates that the first user accepts the suggestion, then adding the user identifier to the body of the message, and further comprising:
    feeding back the detected user interaction to modify generation of the set of inferences based on the detected user interaction.

21. The computer implemented method of claim 13 and further comprising:
  detecting a send indication indicative of the message being sent to a recipient;
  identifying an entity in the message information in response to a means for inferring inferences parsing the message information;
  accessing the user-specific inference store based on the recipient identified by the means for inferring inferences;
  identifying the augmentation to include in the message based on the inference identified by the means for inferring inferences; and
  sending an indication of the augmentation to include in the message to the message service for surfacing to the recipient.

22. The computer implemented method of claim 13, wherein the user interface further includes an actuator configured to be actuated by a first user who is authoring the message to accept or reject to include the augmentation in the message.

23. The computer implemented method of claim 22, wherein upon receiving an actuation via the actuator, attaching the augmentation to the message.

24. A computer implemented method, comprising:
  receiving message content of a message generated by a message service;
  detecting a send indication indicative of the message being sent to a recipient;
  identifying an entity in the message content in response to a means for inferring inferences parsing message information and generating tokens indicative of the entity extracted from the message information;
  accessing a user-specific inference store, specific to the recipient, that stores an inference identified by the means for inferring inferences that indicates a correlation between the entity and an augmentation to include in the message;

identifying the augmentation based on the inference identified by the means for inferring inferences;

providing a user interface, wherein the user interface includes a drop-down menu including a link to the augmentation, and wherein the user interface further includes an actuator configured to be actuated by a first user who is authoring the message to accept the augmentation to include in the message;

sending the augmentation to include in the message to the message service upon receiving an actuation via the actuator;

causing the augmentation that is linked in the drop-down menu to be attached to the message; and including the augmentation to include in the message when the message is rendered by the message service.

* * * * *